(12) United States Patent
Shiraishi et al.

(10) Patent No.: US 6,759,019 B1
(45) Date of Patent: Jul. 6, 2004

(54) PROCESS FOR DESULFURIZATION OF EXHAUST GAS WITH SEAWATER

(75) Inventors: Kouji Shiraishi, Tokyo (JP); Takayoshi Harimoto, Tokyo (JP); Toshiaki Matsuoka, Tokyo (JP); Naoki Fujihata, Tokyo (JP); Akihiko Hongyou, Tokyo (JP); Katsuo Oikawa, Tokyo (JP); Kazuo Takeda, Tokyo (JP)

(73) Assignee: Fujikasui Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/699,373

(22) Filed: Oct. 31, 2000

(30) Foreign Application Priority Data

Nov. 2, 1999 (JP) .......................................... 11-312466

(51) Int. Cl.[7] ........................... C01B 17/62; C01B 17/96
(52) U.S. Cl. .............. 423/210; 423/243.01; 423/243.08
(58) Field of Search ........................... 423/210, 243.01, 423/243.08

(56) References Cited

U.S. PATENT DOCUMENTS 3,892,837 A * 7/1975 Uchiyama et al. .......... 423/242
3,941,572 A * 3/1976 Uchiyama et al. ............. 55/90
5,225,176 A * 7/1993 Greefkes ................ 423/243.01
5,690,899 A   11/1997 Makkinejad et al. ........ 423/243

FOREIGN PATENT DOCUMENTS

JP           3-52623 A   *  3/1991    ............. 423/243.08
JP         11-290643 A   * 10/1999

OTHER PUBLICATIONS

Perry et al. Chemical Engineers' Handbook (5th ed.) McGraw–Hill Book Co. U.S.A.; ISBN 0–07–049478–9; (1973) pp. 14–13 & 18.31.*

* cited by examiner

*Primary Examiner*—Wayne A. Langel
(74) *Attorney, Agent, or Firm*—Arent Fox PLLC

(57) ABSTRACT

A method for removing an acidic component such as sulfite gas ($SO_2$) contained in an exhaust gas comprising by using a system comprising (a) a gas-liquid contact apparatus composed of an absorption column provided internally with at least one perforated plate at the top, bottom, or both top and bottom of the absorption column packed with at least one type of fillers, (b) an apparatus for introducing raw seawater to the absorption column, (c) an apparatus for oxidizing the seawater after gas-liquid contact, and (d) an apparatus for mixing raw seawater with the contact seawater after oxidation, whereby the exhaust gas containing an acidic component is brought into gas-liquid contact with the seawater.

3 Claims, 4 Drawing Sheets

PROCESS FOR DESULFURIZATION OF EXHAUST GAS WITH SEAWATER

BACKGROUND OF THE INVENTION

1. Field of the Invention

The present invention relates to a method of wet removal of an acidic component in an exhaust gas with seawater, in particular an acidic component exhausted from a boiler or various furnaces, and an acidic component from an exhaust gas containing sulfite gas.

2. Description of the Related Art

At present, for example, when heavy oil, coal, etc. are burned in combustion equipments such as a boiler or various types of furnaces and since the fuels contain a sulfur component, the sulfur component is combined with the oxygen in the air at the time of combustion to form sulfur oxides which end up included in the combustion exhaust gas. Such sulfur oxides travel with the gas from the source of generation to regions as much as several thousand kilometers away to cause phenomena such as acid rain or acid fog, polluting the air, water, soil, etc. over a vast region and having detrimental effects on human health.

However, along with the increased international interest in global environmental issues, global scale measures have been sought. In Japan, along with advances made in exhaust gas desulfurization or denitrogenation technologies etc., efficient boiler combustion technology has been accomplished. Substantially 100% antipolution measures are now taken at the source of generation. For example, as a method of wet removal of the acidic component such as the sulfur oxides contained in the gas, a packed column, spray column, bubble cap column, perforated or grid plate column without weir and downcomer etc. have been used to bring the gas to be treated and an alkali treatment solution countercurrently into contact. That is, it can be said that the desulfurization treatment technology for environmental protection has reached the almost perfected stage. For example, a desulfurization efficiency of 90 to 99% has been obtained and commercialized. However, since calcium hydroxide, calcium carbonate, sodium hydroxide, magnesium hydroxide, etc. are used as the alkali treatment solution, there occur problem that, in addition to higher cost, the waste solutions have to be treated, the solid substances have to be treated, etc. Thus, there are problems of complication of the process and high construction and running costs. Therefore, as a method of treatment of exhaust gas using seawater, the present inventors developed a method of wet treatment of exhaust gas by using a perforated or grid plate column without weir and downcomer in JP-A-11-290643 (method of treatment of acidic component in an exhaust gas with seawater). Nevertheless, this method was insufficient in the low Ug region.

As explained above, even a process for removing an acidic component from an exhaust gas, developments of new technologies for simplification of the process, making the equipment more compact, and sharply reducing the construction and running costs are sought not only in the industrialized countries, but in the developing countries as well. In particular, a reliable process is sought for cases where advanced treatment of all regions, including the low Ug region, is frequently required.

SUMMARY OF THE INVENTION

Accordingly, objects of the present invention are to develop new technologies capable of highly removing an acidic component such as a sulfate gas contained in an exhaust gas with a simplified process in a more compact equipment, and at a remarkably reduced the construction and running costs, in view of the international needs, at a wide region including a low Ug and low L/G region.

In accordance with the present invention, there is provided a method for removing an acidic component contained in an exhaust gas comprising by using a system comprising (a) a gas-liquid contact apparatus composed of an absorption column provided internally with at least one perforated plate at the top, bottom, or both top and bottom of the absorption column packed with at least one type of fillers, (b) an apparatus for introducing seawater to the absorption column, (c) an apparatus for oxidizing the seawater after gas-liquid contact, and (d) an apparatus for mixing a noncontact seawater with the seawater after subjected to the mixing and oxidation, whereby the exhaust gas containing an acidic component is brought into gas-liquid contact with the seawater.

In accordance with the present invention, there is also provided a wet method for removing an acidic component contained in an exhaust gas, in a gas-liquid contact apparatus including an absorption column having a column diameter of at least 500 mm and provided with at least one perforated plate having an free-space ratio Fc of 0.25 to 0.5 and provided with at least one type of packing material with a packing height of 0.5 m to 4 m, comprising supplying seawater in such an amount that a ratio L/G of the flow rate L (kg/m²·hr) of the seawater to the flow rate G (kg/m²·hr) of the gas to be treated from the top of the column is at least 3.6 and a flow rate L of the seawater is $1 \times 10^4$ to $25 \times 10^4$ kg/m²·hr and introducing a treated gas in such an amount that a range of a superficial gas velocity Ug in the apparatus from the bottom of the gas-liquid contact apparatus is 0 to 2·Ugm (m/sec):

in the case of using a perforated or grid plate column without weir and downcomer composed of at least one perforated plate and the ratio $\rho_G/\rho_L$ of the density $\rho_G$ (kg/m³) of the treated gas to the density $\rho_L$ (kg/m³) of seawater of 1030 is at least $0.838 \times 10^{-3}$, $$Ugm = 49.14 \, Fc^{0.7} \, (\rho_G/\rho_L \times 10^{-3})^{-0.5} \cdot (L/G)^{-1/3} \cdot \sqrt{g \cdot L}$$

wherein L is a capillary constant $\sqrt{2\sigma/\rho_L \cdot g}$, g is a gravitational acceleration (m/sec²) and σ is a surface tension of seawater (kg/sec²)

whereby the gas to be treated and seawater are countercurrently brought into gas-liquid contact.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 2:
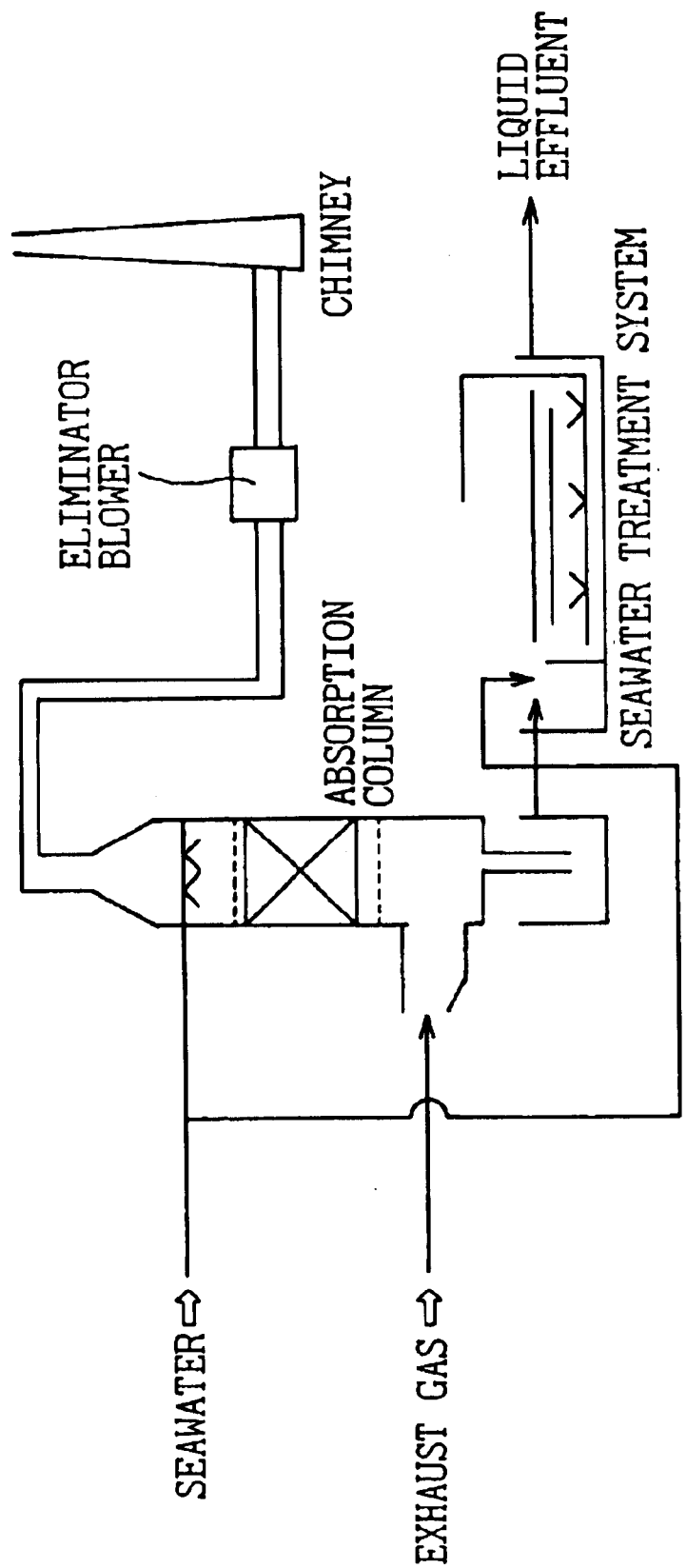
FIG. 2 is a view of the treatment system centered around the apparatus for removal of the acidic component in the exhaust gas with seawater, that is, a gas-liquid contact apparatus, according to the present invention.

According to the present invention, as shown in FIG. 2, since an absorption column composed of a combination of a perforated or grid plate without weir and downcomer and packing material is used, operation is possible from a small liquid/gas ratio to a large liquid/gas ratio, the alkali contained in the used cooling seawater or alkaline waste seawater used in power plants, factories, etc. can be utilized, and the desired acidic component can be removed, without using any chemicals at all, for the purpose of absorbing the gas and of adjusting pH of the absorbing liquid, in the entire process. Note that here the perforated or grid plate without weir and downcomer means a perforated or grid plate having a free-space ratio Fc of 0.25 to 0.5, preferably 0.3 to 0.4. In the present invention, by using a gas-liquid contact apparatus comprising a combination of at least one such perforated or grid plate and packing material with a packing height of at least 0.5 m, preferably 0.5 to 4 m, it is possible to use seawater or waste seawater to remove, in a wet manner, acidic components such as sulfite gas contained in an exhaust gas. Further, since the seawater after the gas-liquid contact makes the components absorbed into it harmless by the supply of air and oxidation by a seawater treatment system, there is no problem with pollution of the ocean at all.

The present invention is not limited in content to the following mechanism, but the chemical principle of the seawater desulfurization process according to the present invention is now explained, when the acidic component is sulfite gas ($SO_2$).

That is, the sulfite gas ($SO_2$) contained in the exhaust gas is absorbed in the seawater, and then converted to bisulfite ions as shown in formula (1):

$$SO_2(gas)+H_2O=HSO_3^-+H^+ \qquad (1)$$

The bisulfite ion thus formed is converted to a sulfate ion as shown in formula (2) by aeration oxidation:

$$HSO_3^-+1/2O_2=SO_4^{2-}+H^+ \qquad (2)$$

The hydrogen ion thus produced by the reaction formula (2) is then reacted with a carbonate ion or bicarbonate ion contained in seawater and is thus neutralized as shown in the reaction formulae (3) and (4):

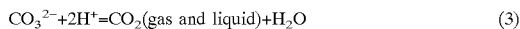
$$CO_3^{2-}+2H^+=CO_2(gas\ and\ liquid)+H_2O \qquad (3)$$

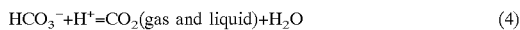
$$HCO_3^-+H^+=CO_2(gas\ and\ liquid)+H_2O \qquad (4)$$

According to the present invention, the sulfite gas finally becomes a sulfate ion which is then dissolved into the seawater. The sulfur content in the ocean is said to be as high as 10¹⁵ tons. This corresponds to about 2300 mg/L of a sulfate ion. The concentration of the harmless sulfate ion contained in the finally treated seawater effluent from the present process only increases by about several mg/liter, and therefore the increase in the sulfur content in the ocean is extremely slight.

Some of the sulfur derived from the sulfur oxides produced due to the use of fossil fuels in modern day industry is naturally recycled by passing through the atmosphere and returning to the earth or the sea in the form of acid rain. As opposed to this, the method of removal of the acidic component in a gas in the present invention is an environmentally friendly technique. According to the process of the present invention, it is possible to recycle sulfur to the ocean in this way by a short cut and effectively prevent the damages such as acid rain, air pollution.

As explained above, the present invention successfully uses a gas-liquid contact apparatus equipped inside thereof with an absorption column containing at least one perforated plate and at least one type of packing materials with a packing height of at least 0.5 m, preferably 0.5 m to 4 m (e.g., RASCHIG™ rings, pole rings, Terralets, interlock saddles, etc.) and introduces seawater from the top of the gas-liquid contact apparatus or introduces seawater from the top of the gas-liquid contact apparatus so as to cause countercurrent gas liquid contact with the gas to be treated and to use the alkali in the seawater to effectively and advancely remove the sulfur oxides contained in the exhaust gas.

Figure 1:
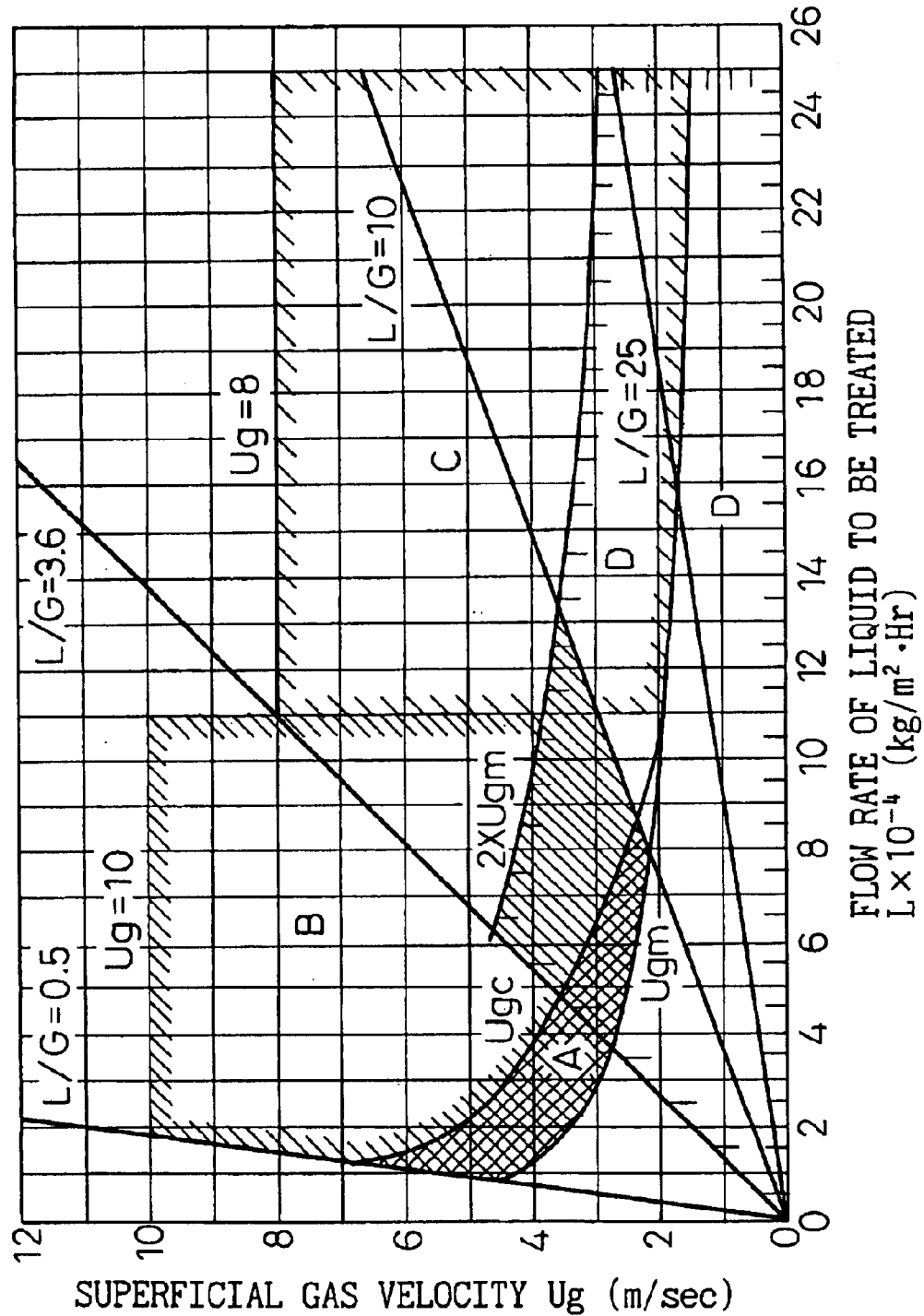
FIG. 1 is a schematic view showing the relationship between the flow rate L of the treatment liquid and the superficial gas velocity Ug in the operating region according to the method of the present invention, wherein the regions A and B show the operating regions according to Japanese Examined Patent Publication (Kokoku) No. 51-31036 and Japanese Examined Patent Publication (Kokoku) No. 60-18206, while the region C shows the operating region according to JP-A-11-290643. The operating region in the present invention is the region of Ug of more than 0, but not more than 2×Ugm, surrounded by the lines of the flow rate of more than 1×10⁴ (kg/m²·hr), L/G=3.6, and the flow rate 25×10⁴ (kg/m²·hr), of the treatment liquid of FIG. 1.

Note that the technology for treatment of an exhaust gas using a perforated plate or grid plate column without weir and downcomer (i.e. ""MORETANA™" column) is disclosed in Japanese Examined Patent Publication (Kokoku) No. 5131036 and Japanese Examined Patent Publication (Kokoku) No. 60-18208 (or U.S. Pat. Nos. 3,892,837 and 3,941,572) but the present inventors found that the operating regions A and B (see FIG. 1) already shown there is not suited for the treatment of exhaust gas utilizing seawater. The above-mentioned JP-A-11-290643 proposed the need for the ratio L/G of the flow rate of gas G supplied to the column and the flow rate L of seawater to be at least 3.6, preferably 7 to 25, and for the superficial gas velocity Ug passing through the ""MORETANA™" column and the flow rate L of the treatment liquid to be the relation in the region C of FIG. 1, that is, in the range from more than 3.43 L$^{-0.0807}$·Ugm (m/sec) to 8 (m/sec) where Ugm is the maximum permitted superficial gas velocity. However, the outside of this range, particularly when Ug is too low, there is the problem that the efficiency of gas-liquid contact drastically falls and it becomes impossible to remove the acidic component. However, according to the present invention, by utilizing an absorption apparatus composed of a combination of a "MORETANA™" column and a packing column, the desired gas-liquid absorption is effectively performed even in the region D of FIG. 1 and the highly efficient desulfurization treatment becomes possible.

Seawater contains approximately 110 to 130 mg/L, in terms of $CaCO_3$, of alkali. The present invention makes highly effective use of seawater—which can be easily obtained in large quantities in the area near the sea. According to the present invention, for example, in the case of a power station using seawater of the nearby ocean as cooling water, it is possible to reuse the seawater after the cooling, originally to be returned to the ocean, to treat the exhaust gas from a boiler and remove the sulfur oxides contained in the exhaust gas therefrom at a high desulfurization rate. Furthermore, according to the present invention even in the case of a factory producing magnesium hydroxide from seawater or a pulp and paper factory using seawater, it is possible to reutilize the waste seawater, which originally has to be retreated before discharge to the ocean, and to use the above gas-liquid apparatus to treat both the acidic exhaust gas and waste seawater.

According to the present invention, the sulfur-absorbed liquid is discharged into the ocean after the acidic sulfur-absorbed liquid containing bisulfite ion, which becomes a source of COD (i.e., chemical oxygen demand), is oxidized by air in the aeration oxidation vessel and after the pH of the mixing seawater is recovered by decarbonization, and therefore, it is possible to discharge the seawater into the ocean and recover the quality of the seawater without using any chemicals.

EXAMPLES

The present invention will now be further explained in detail by, but is by no means limited to, the following Examples.

Example 1

Figure 3:
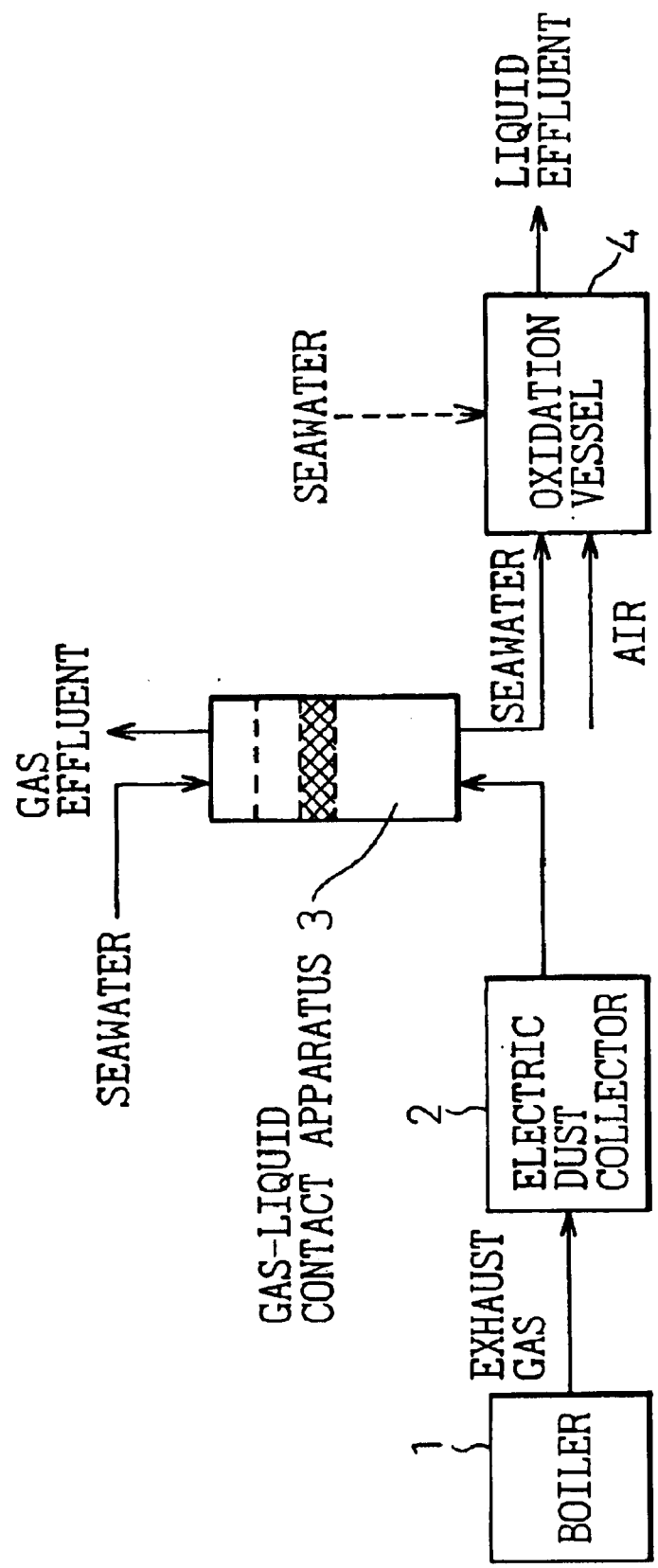
FIG. 3 is an example of an absorption apparatus consisting of a perforated or grid plate without weir and downcomer and a packed column in the case of treating boiler exhaust gas by the method according to the present invention.

FIG. 3 shows an example of a flow of the process, where boiler exhaust gas is treated by the method of the present invention.

Combustion exhaust gas containing about 1000 ppm of sulfur oxides exhausted from the boiler 1 is introduced into an electric dust collector 2 to remove the dust, then the exhaust gas is passed through a gas-liquid contact apparatus 3 provided with one perforated plate having a free-space ratio Fc of 0.3 and a packed portion having 2 m of a packing material (i.e., a ring type, dimensions: 100×78×32 mmH) for treatment, then dispersed therefrom, as a gas effluent, into the atmosphere. Inside the gas-liquid contact apparatus 3, the exhaust gas is introduced from the bottom, while seawater pumped out from the sea is introduced from the top of the gas-liquid contact apparatus 3, whereby the seawater is countercurrently into contact with the exhaust gas in the apparatus 3 and absorb and remove the sulfur oxides contained in the exhaust gas. The acidic waste seawater containing the bisulfite ion discharged from the bottom of the apparatus, as a liquid effluent, is oxidized with air in the air oxidation vessel 4 to oxidize the sulfite ion and to decarbonize the gas W effluent, whereby the pH of seawater is recovered and, then the seawater is discharged to the ocean. The removal rate was 90 to 99% with a liquid gas ratio L/G of 5 to 10, a Ug of 1 to 2 m/sec, and a concentration of sulfur oxides in the gas to be treated of 10 to 100 ppm.

Example 2

Figure 4:
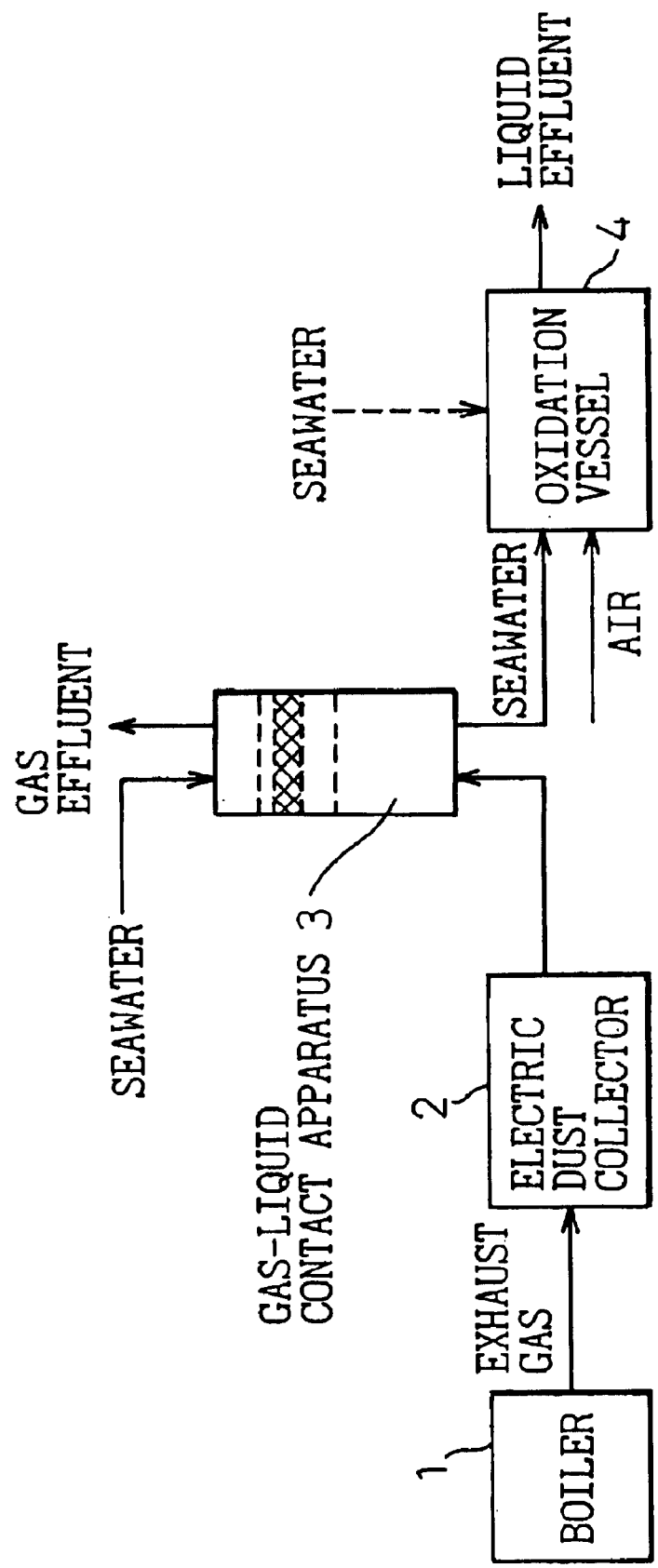
FIG. 4 is an example of an absorption apparatus consisting of a combination of two perforated or grid plates without weir and downcomer and a packed column in the case of treating boiler exhaust gas by the method according to the present invention.

FIG. 4 is another example of the method of treating boiler exhaust gas by the method of the present invention and shows a flowchart of an example in the case of treatment while maintaining a high desulfurization rate corresponding to the low duty operation of a boiler.

Combustion exhaust gas containing about 800 ppm of sulfur oxides exhausted from the boiler 1 is introduced into an electric dust collector 2 to remove the dust, then the exhaust gas is passed through a gas-liquid contact apparatus 3 provided with two perforated plates having a free-space ratio Fc of 0.3 and a packed portion having 1.5 m of a packing material (i.e., ring type, dimension: 100×78×32 mmH) for treatment, then discharged into the atmosphere. Inside the gas-liquid contact apparatus 3, the exhaust gas is introduced from the bottom thereof, while the seawater pumped out from the sea is introduced from the top thereof, whereby the seawater is brought into countercurrent contact with the exhaust gas in the apparatus 3 and the sulfur oxides in the exhaust gas are absorbed and removed. The acidic. waste seawater containing the bisulfite ion discharged from the bottom of the apparatus as a liquid effluent is oxidized and decarbonized by air in the air oxidation vessel 4, and the pH of seawater is recovered, then the seawater is discharged, as a liquid effluent, to the ocean. The removal efficiencies were 99.4%, 98.7%, 97.9%, 96.9%, and 92.5% with a flow rate of seawater L ($5\times10^4$ kg/m$^2$·hr)$_2$Ug of 0.25, 0.5, 1, 1.5, and 2 m/sec and a concentration of sulfur oxides in the gas to be treated of 5, 10, 17, 25, and 60 ppm.

As explained above, according to the present invention, it is possible to advancely and effectively treat the sulfur oxides contained in an exhaust gas with seawater, despite the region being unable to be treated by "MORETANA™" column in the past, that is, a low Ug, and possible to protect the environment simply and with a compact equipment and low cost.

What is claimed is:

1. A method for removing an acidic component contained in an exhaust gas comprising:

(a) introducing raw seawater and the exhaust gas into a gas-liquid contact apparatus composed of an absorption column provided internally with at least one perforated plate at the top, bottom, or both top and bottom of the absorption column packed with at least one type of fillers so as to effect an exhaust gas-seawater counter current contact treatment, (b) mixing the seawater with raw seawater, after the gas-liguid of step (a), with air in an oxidation apparatus, and thereafter (c) oxidizing the acidic component absorbed in the seawater, and discharging the oxidized seawater, without using chemicals, to the ocean, wherein, in the step (a), the seawater is introduced into a gas-liquid contact apparatus comprising an absorption column having a column diameter of at least 500 mm and provided with at least one perforated plate having a free-space ratio Fc of 0.25 to 0.5 and packed with at least one type of packing material to a packing height of 0.5 m to 4 m, in such an amount that a ratio L/G of the flow rate L (kg/m$^2$·hr) of the seawater to the flow rate G (kg/m$^2$·hr) of the gas to be treated from the top of the column is at least 3.6 and a flow rate L of the seawater is $1\times10^4$ to $25\times10^4$ kg/m$^2$·hr and wherein the exhaust gas is introduced into the gas-liquid contact apparatus in such an amount that a range of a superficial gas velocity Ug in the apparatus from the bottom of the gas-liquid contact apparatus is less than 2 Ugm (m/sec), wherein $$Ugm = 49.14\ Fc^{0.7}(\rho_G/\rho_L \times 10^{-3})^{-0.5} \cdot (L/G)^{-1/3} \cdot \sqrt{g \cdot L}$$

wherein L is a capillary constant $\sqrt{2\sigma/\rho_L \cdot g}$ g is a gravitational acceleration (m/sec$^2$), σ is a surface tension of seawater (kg/sec$^2$), and the ratio $\rho_G/\rho_L$ of the density $\rho_G$ (kg/m$^3$) of the treated gas to the density $\rho_L$ (kg/m$^3$) of seawater is at least $0.838\times10^{-3}$.

2. A method as claimed in claim 1, wherein the free-space ratio Fc is 0.3 to 0.4 and the ratio L/G is 7 to 25.

3. A method as claimed in claim 1, wherein said exhaust gas is exhausted from a boiler.

* * * * *